No. 654,711. Patented July 31, 1900.
C. CARMAN.
HORSESHOE.
(Application filed Jan. 8, 1900.)
(No Model.)
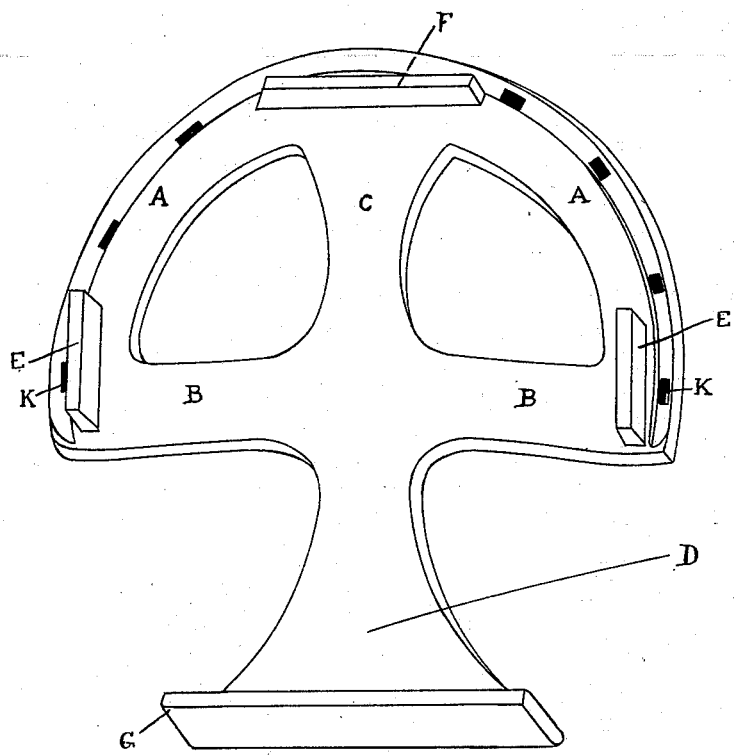
WITNESSES:
INVENTOR

UNITED STATES PATENT OFFICE.

CHARLES CARMAN, OF MADISON, WISCONSIN.

HORSESHOE.

SPECIFICATION forming part of Letters Patent No. 654,711, dated July 31, 1900.

Application filed January 8, 1900. Serial No. 677. (No model.)

*To all whom it may concern:*

Be it known that I, CHARLES CARMAN, a citizen of the United States, residing at Madison, in the county of Dane and State of Wisconsin, have invented a new and useful Improvement in Horseshoes, of which the following is a specification.

The object of my invention is to provide a horseshoe which will take the pressure of the foot of the horse due to his weight and striking force from the quarters of the hoof and transfer this pressure to the frog.

I attain this object by means of the device illustrated in the accompanying drawing, in which the portion A is similar to what is known as a "three-quarter shoe"—that is, an ordinary horseshoe with its heels which bear on the quarters of the hoof cut away, thus allowing no pressure to be applied to the quarters of the hoofs. The portion A is provided with the usual nail-holes K for attaching the shoe to the hoof.

Formed as part of portion A and connecting the ends thereof is a transverse bar B. Also formed as a part of portion A and transverse bar B and symmetrical with the longitudinal axis of the hoof is the brace C, an extension of which backward from transverse bar B forms the frog-support D. The brace C is not necessary in all cases, but may be added to increase the rigidity of the shoe.

The frog-support D is of such shape and size as will allow the pressure of the greater part of the frog to bear directly upon it, and thus the pressure of the foot is taken entirely by portion A and frog-support D, relieving the quarters of the hoof of all pressure, which attains the object of my invention.

My device can be used as a plate-shoe or it can be supplied with toe-calk F, side calks E, and rear calk G, or the plate may have all or portions of its surface covered with an elastic substance for the prevention of noise, jar, or slipping.

I claim as my invention and desire to secure by Letters Patent—

The combination of a three-quarter horseshoe, with a transverse bar connecting the ends thereof, a longitudinal brace connecting the toe of said three-quarter shoe with said transverse bar, and a frog-support extending backward from said transverse bar, all joined as one piece, substantially as described.

CHARLES CARMAN.

Witnesses:
W. T. MCCONNELL,
W. H. HARWOOD.